United States Patent

[11] 3,623,828

[72] Inventor  Harold Shapiro
              Silver Spring, Md.
[21] Appl. No. 789,045
[22] Filed     Dec. 31, 1968
[45] Patented  Nov. 30, 1971
[73] Assignee  The United States of America as
               represented by the Administrator of the
               National Aeronautics and Space
               Administration

[54] TRAP FOR PREVENTING DIFFUSION PUMP BACKSTREAMING
     10 Claims, 11 Drawing Figs.

[52] U.S. Cl. .................................................. 417/152,
                                              55/446, 55/464
[51] Int. Cl. ..................................................... F04f 9/06
[50] Field of Search ........ ............................... 55/461-465,
                     439, 442-446; 230/101; 62/55.5;
                     209/506; 261/112; 417/55, 158, 152

[56]              References Cited
               UNITED STATES PATENTS
  483,992  10/1892  Cochrane .....................  55/464
1,292,450   1/1919  Fisher ..........................  55/464
3,454,214   7/1969  Milleron ......................  417/154
2,954,838  10/1960  Nuorivaara ..................  161/139
3,188,785   6/1965  Butler ..........................  62/55.5
3,310,227   3/1967  Milleron ......................  62/55.5
  520,675   5/1894  Gindele .......................  55/444
1,557,442  10/1925  Eichelman ...................  55/464
1,572,245   2/1926  Quinn ..........................  55/446
1,807,983   6/1931  Hegan et al. .................  55/444
2,204,489   6/1940  Gray ............................  209/506
2,386,299  10/1945  Downing ......................  230/101
2,478,934   8/1949  Morse ..........................  209/506
3,048,039   8/1962  Hackler .......................  55/186
3,175,373   3/1965  Holkelboer et al. ...........  62/55.5
3,231,490   1/1966  Fry ..............................  261/112

Primary Examiner—Frank W. Lutter
Assistant Examiner—Bernard Nozick
Attorneys—R. F. Kempf, E. Levy and G. T. McCoy ABSTRACT: An oil-backstreaming trap is located in a vacuum line between an oil diffusion pump and the evacuated system so that gases from the system are drawn through the trap on the way to the pump. First and second baffle plates extend partially across the cross-sectional area of the trap and are spaced apart from each other along the direction of gas flow. The surface of the baffle plate closest to the evacuated system is smooth. The other baffle plate surfaces are roughened to form a large plurality of raised and depressed portions such as are formed by milling the roughened surfaces to form a large plurality of pyramid-shaped elements. In this manner, oil vapor from the diffusion pump which tends to backstream into the evacuated system, is coalesced on the roughened surfaces to form oil drops which then fall back into the diffusion pump.

PATENTED NOV 30 1971 3,623,828

INVENTOR
HAROLD SHAPIRO

BY
*John McCoy*
*Carl Levy*
ATTORNEYS

TRAP FOR PREVENTING DIFFUSION PUMP BACKSTREAMING

The invention described herein was made by an employee of the United States Government and may be manufactured or used by or for the Government for governmental purposes without the payment of any royalties.

BACKGROUND OF THE INVENTION

Oil diffusion pumps are frequently used to evacuate high-vacuum systems. In such cases, oil from the pump has a tendency to migrate and/or "backstream" into the evacuated system so as to both contaminate the system and prevent it from reaching the desired vacuum. Hence, oil-backstreaming traps are often located between the pump and the system to prevent such migration.

One common type of oil-backstreaming trap employs a container for a cryogen such as liquid nitrogen. Such containers are arranged so as to present a cold surface to the flow of gas between the vacuum chamber and the pump. In this manner, the gas molecules that are drawn out of the system merely bounce off of the cold surface, but the heavy oil molecules freeze and become "trapped" on the cold surface. These traps, however, are quite expensive to both construct and maintain. In this respect, such traps only maintain their desired low temperatures for typical periods of about 8 to 20 hours or so. It is an object of this invention, therefore, to provide a trap that is less expensive to manufacture than the cryogen-type; and does not require an additional expense to maintain the trap's cryogen.

Another type of oil-backstreaming trap employs various types of filters for preventing the diffusion pump's oil molecules from the backstreaming into the evacuated system. Some such traps provide a tortuous path through which the oil molecules must travel; others merely provide a bed of particulate materials such as molecular sieves, or charcoal. These types of traps, however, have two major disadvantages. Firstly, they have a tendency to become saturated with oil at which time oil backstreaming increases. Secondly, they obstruct the flow path of gas molecules from the evacuated system so as to cut down on the diffusion pump's conductance and thereby reduce its pumping speed and efficiency. Consequently, it is another object of this invention to provide a trap which does not saturate; and which provides far less obstruction to the pump's conductance so that the pump maintains a desirably high pumping speed.

SUMMARY OF THE INVENTION

In the past, particularly in connection with the cryogen types of traps, it has been through of that the backstreaming oil migrated or crept in films along the trap and filter surfaces. For this reason, the surfaces of the cryogen traps have been made smooth to accommodate many layers of the frozen oil. Similarly, the filters have been designed so as to have the largest possible amount of surface area to accommodate the largest possible film area prior to the filter's becoming saturated. This invention, on the other hand, is based upon an observation that the backstreaming oil from the diffusion pump travels mostly in the form of molecules or droplets, rather than films. In this respect, in accordance with a principle of this invention, the oil backstreaming is prevented by coalescing the oil molecules or droplets on a roughened surface extending partially across the trap's cross section and made up of high and low portions so as to form drops of oil at the low portions whereupon, when large enough, the drops fall back toward the diffusion pump.

BRIEF DESCRIPTION OF THE DRAWINGS

The foregoing and other objects, features, and advantages of the invention will be apparent from the more particular description of preferred embodiments thereof as illustrated in the accompanying drawings. The drawings are not necessarily intended to be to scale, but rather are presented so as to illustrate the principles of the invention in clear form.

In the Drawings

DESCRIPTION OF THE PREFERRED EMBODIMENTS

Figure 1:
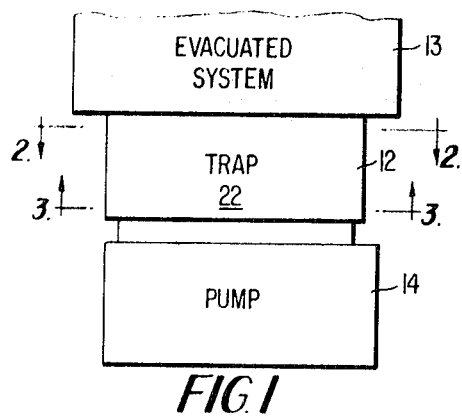
FIG. 1 is a schematic illustration of an oil-backstreaming trap located between an oil diffusion pump and a system evacuated by the pump.

In FIG. 1 an oil-backstreaming trap 12 is located between an evacuated system 13 and an oil diffusion pump 14. Such pumps are used where vacuums of greater than about 0.01 torr are desired. They operate by heating a liquid such as heavy oil or mercury to form a curtain or vapor thereof for entrapping molecules of unwanted gas from the evacuated system. In this respect, it should be noted that although the instant invention is described in terms of a trap for preventing oil backstreaming, it is equally useful to prevent other types of molecules from backstreaming into evacuated systems.

Figure 2:
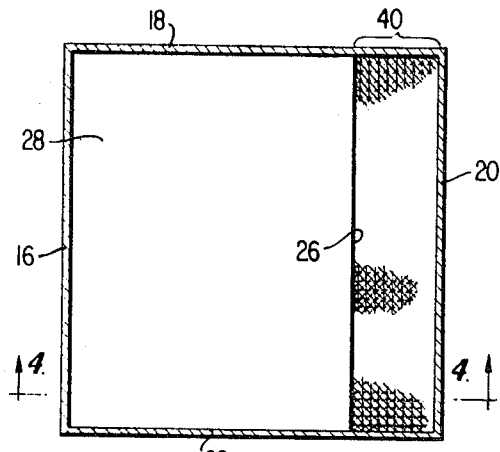
FIG. 2 is a cross section of a preferred embodiment of the trap of the invention taken along the line 2—2 of FIG. 1.
Figure 3:
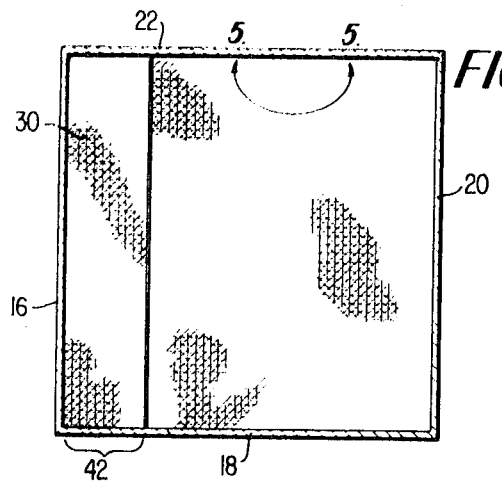
FIG. 3 is a cross-sectional view of a preferred embodiment of the trap of the invention taken along the lines 3—3 in FIG. 1.
Figure 4:
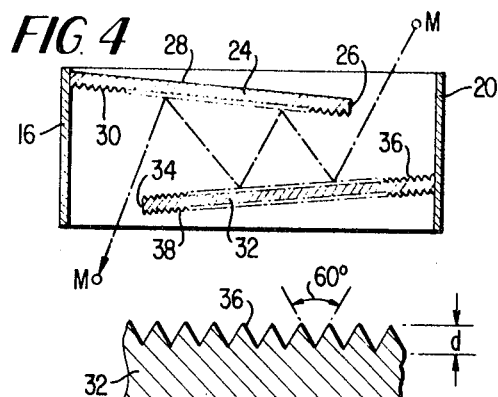
FIG. 4 is a cross section of a trap of the invention taken along the lines 4—4 in FIG. 2.

As is illustrated in more detail in FIGS. 2, 3, and 4, the trap is comprised of four walls 16, 18, and 20, and 22 joined together to form a square, open-ended box adapted to be fastened on one end to the vacuum system system and on the other end to the diffusion pump. More specifically, the trap is to be inserted between the pump and the vacuum chamber in any suitable manner such as fastened, put in a drawer, or held in a loose configuration, for example. A first baffle plate 24 extends across the trap's cross section from the rear wall 18 to the front wall 22 and declines downwardly at about 5 percent declination from the wall 16 to an edge 26 thereof so as to cover about 70 percent of the trap's cross sectional area. The surface 28 of the baffle plate 24 adjacent the evacuated system 13 is smooth so that gas molecules drawn from the evacuated system will not adhere thereto. The underside 30 of the plate 24, however, is roughened in a manner to be described in more detail shortly. The trap may be formed of aluminum, stainless steel or copper, for example.

A second baffle plate 32 also extends across the trap's cross section from wall 18 to wall 22; and declines downwardly on about a 3 percent slope from sidewall 20 to edge 34 thereof so as to extend across about 75 percent of the trap's cross-sectional area. Both of the baffle plate 32's major surfaces 36 and 38 are roughened.

In operation, gas molecules M from the evacuated system 13 pass through the trap's entry throat 40 located between the upper plate 24's edge 26 and the sidewall 20. They then bounce back and forth between the roughened surfaces 30 and 36 of the upper and lower baffle plates, respectively, (as illustrated by the solid line of a typical molecule's path in FIG. 4;) and exit from the trap's exit throat 42 located between the lower plate 38's edge 34 and the sidewall 16. Oil molecules from the diffusion pump 14, however, are heavier and become trapped in the depressions of surfaces 30, 36, and 38. The thrusly trapped molecules than coalesce to form drops of oil (or other diffusion pump liquid) which fall or drip off of the roughened surfaces back toward the diffusion pump 14.

Figure 5:
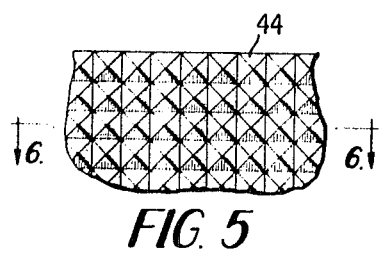
FIG. 5 is an enlarged fragmentary view of a roughened baffle plate taken along the arc 5—5 in FIG. 3.
Figure 6:
FIG. 6 is a sectional view taken along the lines 6—6 of FIG. 5.
Figure 7:
FIG. 7 is a perspective view of a portion of the pyramided surface illustrated in FIG. 5.

In one embodiment of the invention, the roughened surfaces were obtained by repeatedly passing a milling head over the plate's surface to form a plurality of small pyramids 44 as illustrated in FIGS. 5–7. In this respect, the pyramids were equilateral so as to have 60° faces as shown in FIG. 6; and a depth $d$ of about 25 percent of the plate's thickness; or about 0.06 of an inch in one embodiment having a plate thickness of about 0.25 inch.

Figure 8:
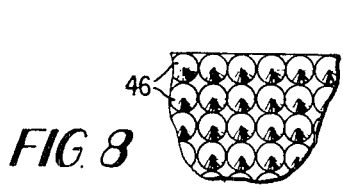
FIG. 8 is an enlarged fragmentary view of an alternative type of roughened surface corresponding to that illustrated in FIG. 5.
Figure 9:
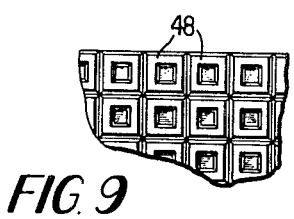
FIG. 9 is an enlarged fragmentary view of still another type of roughened surface.
Figure 10:
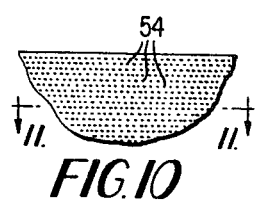
FIG. 10 is an enlarged fragmentary view of yet another alternative type of roughened surface; and, FIG. 11 is a cross-sectional view of FIG. 10's roughened surface taken along the lines 11—11 thereof.
Figure 11:
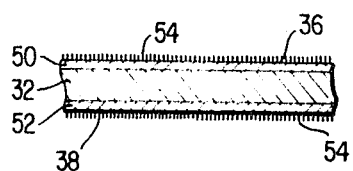

In another embodiment, the roughened surfaces were comprised of a large plurality of conical elements 46 such as are illustrated in FIG. 8. Still another embodiment, the surfaces are roughened in the form of a wafflelike pattern comprised of a plurality of elements 48 (FIG. 9); and in yet another embodiment, the surfaces are merely roughened by means of bristle pads 50 and 52 having bristles 54 extending outwardly therefrom.

A series of operational tests were conducted on an embodiment of the invention having the surfaces 30, 36 and 38 roughened in accordance with the pyramid structures illustrated and described in connection with FIGS. 5–7. This test structure was placed between an evacuated system and an oil diffusion pump; and subjected to actual operation at a vacuum of less than $10^{-6}$ torr for a period of 100 hours. In this respect, a quartz crystal microbalance was used to detect any oil that backstreamed into the evacuated system through the trap of the invention. There was no detectable backstreaming, however, during the entire 100-hour test period.

A standard cryogen-cooled, chevron-baffle type of trap was then inserted between the pump and the evacuated system and it too, was subjected to 100 hours of operation at a vacuum of less than $10^{-6}$ torr. The quartz crystal microbalance, however, indicated that the standard, chevron-baffle structure permitted 1.5 micro-g./cm.$^2$/minute to backstream from the diffusion pump into the evacuated system.

The above-noted test on a preferred embodiment of the invention rather dramatically illustrates the improved results that are obtainable by use of the invention's structure. Moreover, the structure of the invention does not require the addition of a cryogen at periodic intervals during the trap's use; nor does it reduce the pump's conductance as is the case with the filter type of traps.

While the invention has been particularly shown and described with reference to preferred embodiments thereof, it will be understood by those skilled in the art that various changes in form and details may be made therein without departing from the spirit and scope of the invention. For example, although the invention's trap has been described in connection with uncooled baffle plates, it will be appreciated that the principles of the invention would be equally as applicable if the baffle plates are cooled so as to perhaps freeze and thereby trap water molecules from the evacuated system to prevent them from being drawn into the diffusion pump. In addition, while the trap has been illustrated as a square open-ended box, it will be appreciated that it may be alternatively round, circular, oval or, more generally, any configuration that fits the space available. Finally, it will be appreciated that while the invention provides a trap that does not use a cryogen fluid, it can be used with a cryogen-type trap if desired, or it can be used with an appropriate heating means for bake out.

What is claimed is:

1. Apparatus for preventing backstreaming oil molecules from a diffusion pump from entering a system being evacuated said apparatus comprised of:
   a conduit located between and connecting said pump and said system being evacuated thereby;
   a first impervious baffle plate extending from one side of said conduit toward an opposite side partially across and over the major portion of the cross-sectional area of said conduit;
   a second impervious baffle plate extending partially across and over the major portion of said cross-sectional area of said conduit from said opposite side toward side on side, said second baffle baffle plate being spaced apart from said first baffle plate in the direction from said evacuated system to said diffusion pump;
   each of said baffle plates having a first surface thereof facing said evacuated system and a second surface thereof facing said diffusion pump;
   said second surfaces being roughened surfaces formed of an arrangement of closely spaced projections defining alternate raised and depressed portions forming a plurality of closely spaced small pockets for trapping the oil molecule and coalescing said backstreaming oil molecules from said diffusion pump to form drops thereof in said small pockets.

2. The apparatus of claim 1 wherein said roughened surface is comprised of a large plurality of pyramid-shaped elements.

3. The apparatus of claim 1 wherein said roughened surface is comprised of a large plurality of conical shaped elements.

4. The apparatus of claim 1 wherein said roughened surface comprises a waffle pattern.

5. The apparatus of claim 1 wherein said first baffle plate declines from said one side of said conduit toward said diffusion pump at a slope of about 5 percent and extends across about 70 percent of the cross-sectional area of said conduit.

6. The apparatus of claim 1 wherein the surface of said said second baffle plate are roughened; said second baffle plate declines from said another side of said conduit downwardly toward said diffusion pump at a slope of about 3 percent; and extends across about 75 percent of cross-sectional area of said conduit.

7. The apparatus of claim 5 wherein said baffle plate declines from said one side of said conduit toward said diffusion pump at a slope of about 5 percent and covers about 70 percent of the cross-sectional area of said conduit.

8. The apparatus of claim 7 wherein said roughened surfaces are comprised of a large plurality of pyramid-shaped elements.

9. The apparatus of claim 7 wherein said roughened surfaces are comprised of a large plurality of conical shaped elements.

10. The apparatus of claim 7 wherein said roughened surfaces comprise a waffle pattern.

* * * * *